July 9, 1968
W. D. ZITZLOFF
3,392,217
METHOD AND APPARATUS FOR REMOVING SUPERFLUOUS MOLDING
MATERIAL FROM PLASTIC MOLDING APPARATUS
Filed Dec. 10, 1965
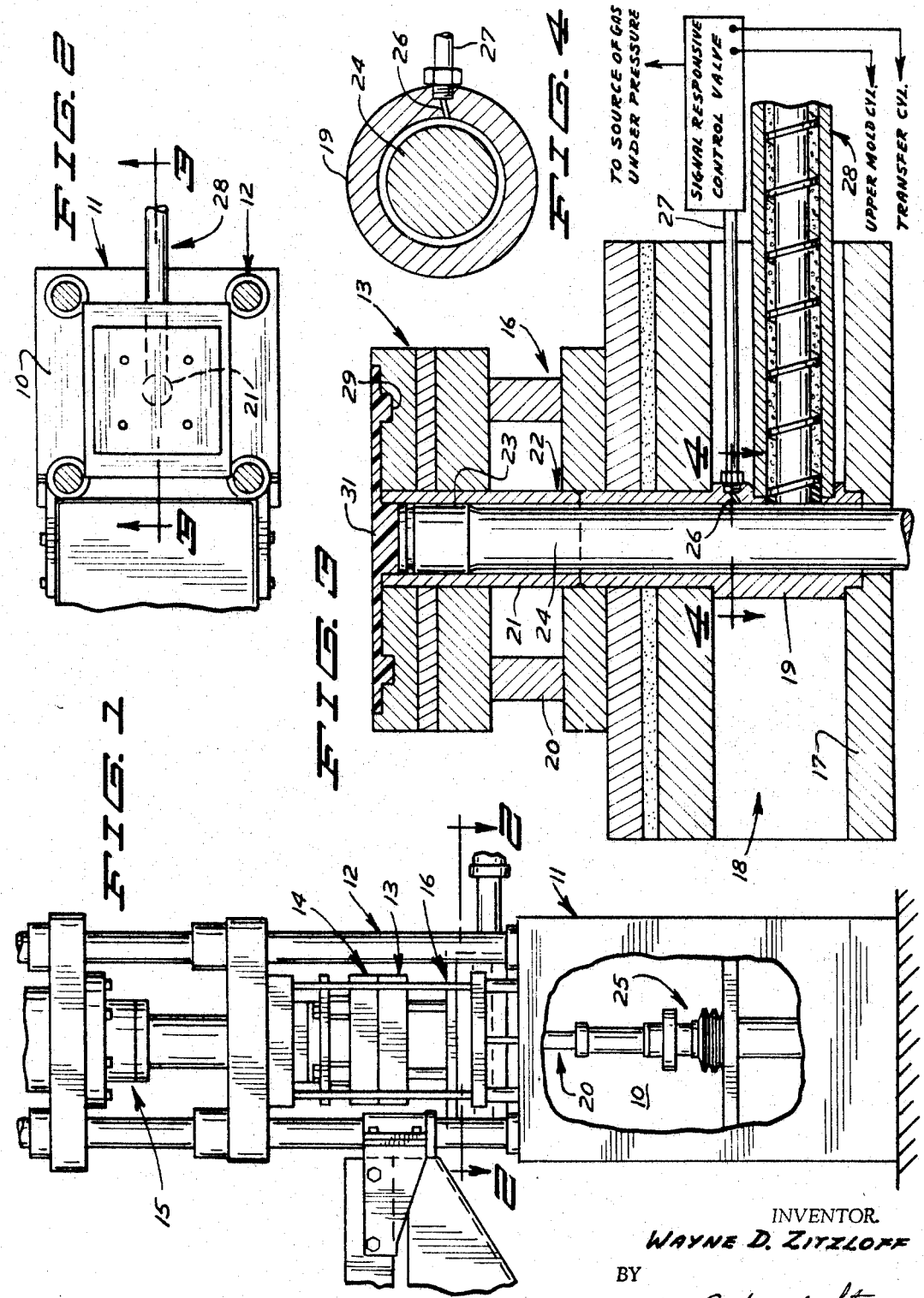
INVENTOR.
WAYNE D. ZITZLOFF
BY
Carlsen, Carlsen & Sturm
ATTORNEYS

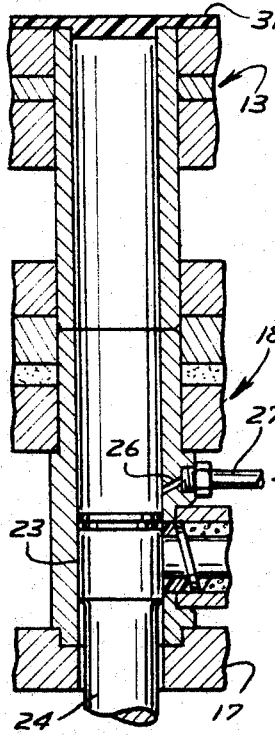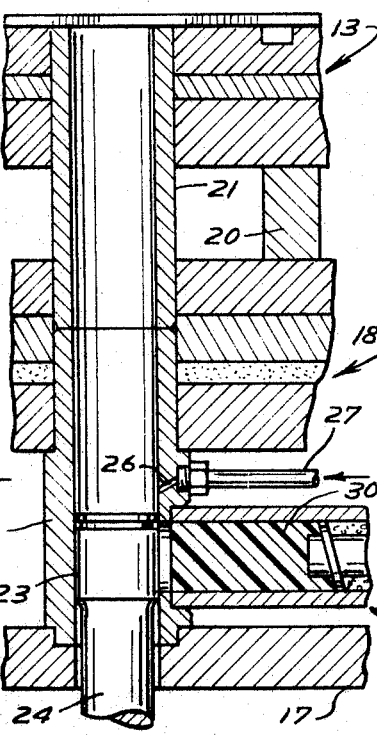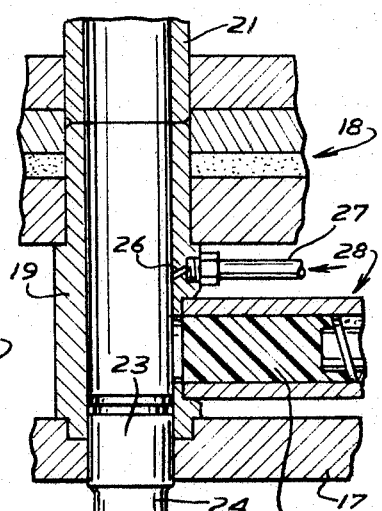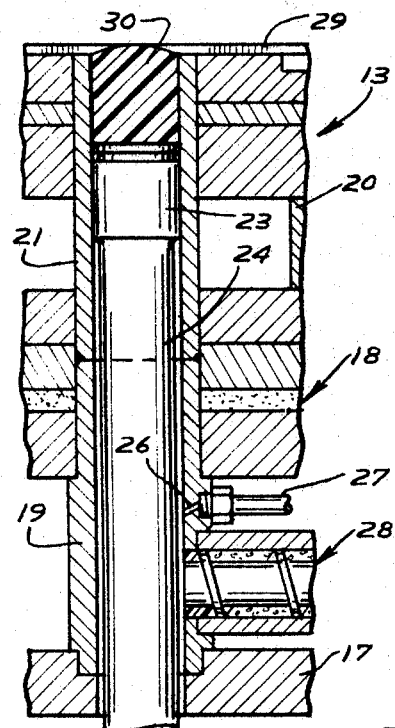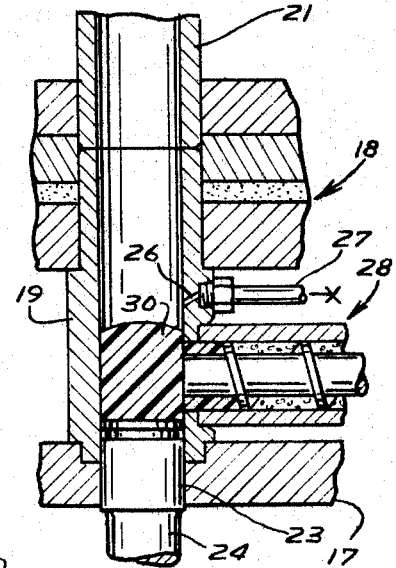

3,392,217
METHOD AND APPARATUS FOR REMOVING SUPERFLUOUS MOLDING MATERIAL FROM PLASTIC MOLDING APPARATUS
Wayne D. Zitzloff, Crystal, Minn., assignor, by mesne assignments, to Rodgers Plastics Equipment, Inc., Minneapolis, Minn., a corporation of Minnesota
Filed Dec. 10, 1965, Ser. No. 513,032
10 Claims. (Cl. 264—39)

ABSTRACT OF THE DISCLOSURE

Plastic molding apparatus of the type utilizing a transfer pot and a transfer plunger to compress conditioned plastic molding material into a mold in which a jet of gaseous fluid under pressure is directed into the transfer pot and energized during predetermined portions of the cycle of operation of the plastic molding apparatus to remove unused material from the transfer pot and the plunger.

---

This invention relates generally to plastic molding apparatus and is more particularly directed to the class of apparatus in which a transfer pot and reciprocal plunger is utilized to inject conditioned plastic molding material into a separable mold wherein the material transferring portion of the apparatus is subject to the undesirable accumulation of unwanted and superfluous flash in the form of cured, semi-cured or conditioned plastic molding material.

In prior art apparatus with which my invention is concerned, the speed of operation and efficiency of molding apparatus has been impaired by the accumulation of plastic molding material in the portions of the apparatus which are utilized to transfer conditioned material from a material conditioner into a mold cavity wherein the conditioned plastic is cured, as by heating, to create a molded part. The presence of flash, or unwanted plastic molding material, in the material transferring portions of the apparatus is undesirable because it may lead to the molding of a defective part either through the introduction of partially cured or cured plastic molding material into the mold cavity or may result in the introduction of a larger quantity of materials than the mold cavity is designed to accept and, again, a defective molded part results. Prior art apparatus for removing the flash in connection with automatic operation of molding apparatus does utilize what is known as a "wiping cycle" in which the material transferring portion of the apparatus is operated through its normal cycle of movement without effecting a transferring operation merely to provide one method of allowing the flash that may have accumulated to fall off and be removed in the absence of any additional conditioned material. This, of course, materially adds to the cycling time of molding apparatus and results in a substantially lower efficiency of operation from a production standpoint. The inclusion of one or more wiping cycles has also been observed to be possessed of a relatively low efficiency in removing all of the undesired flash that may be present in the transferring portion of the apparatus. For a general discussion of molding apparatus of the general class with which my invention is concerned, reference is made to a co-pending application, Ser. No. 490,937, filed Sept. 28, 1965, in the name of John L. Rodgers, Jr., for Method and Apparatus for High Speed Injection Molding.

It is therefore an object of my invention to provide an improved method of eliminating undesired flash material from the material transferring portions of plastic molding apparatus.

It is a further object of my invention to provide improved apparatus for eliminating undesired flash material from the material transferring portions of plastic molding apparatus.

A further object of my invention is to provide a method of removing undesired flash material from the transfer pot and plunger of a material transferring portion of plastic molding apparatus.

A still further object of my invention is to provide improved apparatus for removing undesired flash material from the transfer pot and plunger of the material transferring portions of plastic molding apparatus.

A still further object of my invention is to provide improved method and apparatus for removing undesired flash material from a transfer pot and plunger assembly by applying a jet of gaseous material under pressure.

A still further object of my invention is to provide a method and apparatus for generating a helical peripheral flow of gaseous material under pressure in the transfer pot and plunger portion of plastic molding apparatus.

With these and other objects of my invention in mind, it may be seen that the described embodiment of my invention is shown in the environment of a vertically disposed plastic molding press which is provided with vertically separable upper and lower mold members, each having suitable registering cavities for receiving and curing conditioned plastic molding material so as to provide a molded plastic product of predetermined size and shape. In the illustrated, generally vertically disposed apparatus, a plastic molding material conditioning apparatus is operative to provide predetermined quantities of conditioned plastic molding materials for transfer to the mold cavities by suitable apparatus comprising a portion of the plastic molding apparatus which includes a transfer pot and a transfer plunger which is operative to receive and convey the conditioned plastic molding material from the material conditioner up to and into the cavities defined by the upper and lower mold members.

The plunger is preferably comprised of an elongated piston that is operated by a cooperating cylinder and which has an enlarged head, or cap, portion which is reciprocably operative in the transfer pot to provide the conveying function described above. The observed presence of undesirable quantities of flash material within the transfer pot itself and in or about the transfer plunger serves to readily indicate the need for an efficient and effective method and apparatus for removing the flash material. This is provided, in the illustrative embodiment, through the use of a properly directed jet of gaseous material under pressure which serves to remove the flash material so that the operating cycle of the plastic molding apparatus may continue in an uninterrupted, efficient and effective manner.

These and other objects of my invention may become apparent to those skilled in the art upon a consideration of the appended specification, claims and drawing, in which:

FIG. 1 is a side elevational view of the essential portions of plastic mold apparatus to which the principles of my invention may be applied;

FIG. 2 is a sectional view taken along section lines 2—2 of FIG. 1;

FIG. 3 is an enlarged fragmentary sectional view of a portion of the apparatus shown in FIG. 1;

FIG. 4 is a sectional view of a portion of FIG. 3 taken along section lines 4—4;

FIGS. 5, 6, 7, 8 and 9 are enlarged fragmentary sectional views similar to that shown in FIG. 3 showing the relative position of the various elements of the plastic molding apparatus shown in FIG. 1, at various stages in the operation thereof; and FIG. 10 is a perspective, diagrammatic schematic drawing illustrating the principles of my invention in relation to the flow of gaseous material under pressure which serves to effectuate the objects of my invention.

Referring now to the drawings in which like elements have been identified by like reference characters, there is shown in FIG. 1 a plastic molding apparatus indicated generally by reference character 10, having a base portion 11 and a vertically upwardly extending frame portion 12 disposed thereon. A suitable article molding assembly is shown comprised of a lower mold 13 and a vertically reciprocable upper mold 14, each having suitable registering cavities which, when in engagement, serve to define the shape of a molded article and each of which may include suitable mold heating means (not shown). Upper mold 14 is vertically and upwardly reciprocable with respect to lower mold 13 by the operation of an upper mold piston and cylinder assembly indicated generally by reference character 15, which may be operable to open and close the mold assembly. A suitable support for lower mold 13 is indicated generally by reference character 16. Support 16 may also include a transfer pot and a transfer plunger 22 that is vertically reciprocably journaled in transfer cylinder 25 shown in the broken away portion of base 11 of plastic molding apparatus 10.

A source of conditioned plastic molding material is indicated generally by reference character 28. A fragmentary representation of a molded article unloading assembly is shown disposed on the middle left hand side of plastic molding apparatus 10 and is designed to operate in the manner well known to those skilled in the art and as indicated on the above-noted co-pending application relating to high speed molding apparatus. Also indicated in a fragmentary manner, is a plastic molding material conditioning apparatus, 28, which may, for example, be comprised of the apparatus shown generally in the U.S. Patent No. 2,734,226, issued Feb. 14, 1956 in the name of W. H. Willert, for Injection Molding Apparatus which shows generally an apparatus for accumulating a heated charge of plastic molding material, under pressure, for transferring to the article defining registering cavities of a suitable mold.

In the fragmentary enlarged sectional views of FIGS. 3 to 9 inclusive, lower mold 13 is shown supported on a lower mold support 16 having a base member 17, a grid supporting means 18, having a grid pot 19, and a plurality of vertically disposed mold supporting spacers 20. Lower mold 13 also includes a mold pot 21 which is disposed in cooperative registering position with respect to grid pot 18. A transfer plunger, indicated generally by reference character 22, is shown having an enlarged head, or cap, portion 23 mounted on top of a piston portion 24 that is in turn reciprocably journaled in a transfer plunger cylinder 25 that is stationarily disposed in base portion 11 of plastic molding apparatus 10.

A means for providing a jet of gaseous material under pressure is indicated by reference character 26 as being disposed near the lower portion of grid pot 19 and is operatively connected in fluid communication to a tube member 27 that is adapted to be connected to a source of gaseous material under pressure through suitable valve means indicated generally on FIG. 3 of the drawings by the legend Signal Responsive Control Valve which is in turn connected to a source of gas under pressure and which may also be connected to receive signals from, for example, the upper mold cylinder, 15, on FIG. 1 and the transfer plunger cylinder 25, on FIG. 1.

Quantities of conditioned and cured plastic material are indicated on the several figures of the drawing by reference characters 30 and 31 respectively. In the illustrative embodiment shown in the drawings, grid pot 19 is shown having a laterally extending aperture adapted to engage and cooperate with the outlet of the material conditioning means, 28, which aperture, may be operatively interrelated with the top portion, or head, 23 of transfer plunger 22 to accumulate and discharge a predetermined quantity of conditioned plastic molding material into grid pots 19 for ultimate transfer into the cavity defined intermediate upper and lower molds 13 and 14. The cavity which might, for example, be provided in lower mold 13 is indicated by reference character 29 on FIG. 3 of the drawings. It may thus be seen that grid pot 19 and mold pot 29 are in cooperative registering relationship and that transfer plunger 22 is reciprocably disposed therein to provide the function of transferring material deposited on top of transfer plunger 22 when it is in its lowermost position in grid pot 19, upwardly, and into the article defining registering cavities in upper and lower molds 14 and 13 respectively.

The aperture 26, which serves to direct the flow of gaseous material under pressure into the transfer pot defined by grid pot 19, and mold pot 21, is shown as being oriented slightly downwardly with respect to a horizontal plane in the illustrative embodiment and at an angle with respect to a radial line emanating from the coaxial center axes of grid pot 19 and transfer plunger 22. This provides the helical, peripheral, vortex flow of gaseous material upwardly and outwardly from grid pot 19 when plunger 22 is in the positions shown in FIGS. 5 and 6 of the drawings. Under this condition of operation, gaseous material, commonly air, will be drawn down into the transfer pot comprised of grid pot 19 and mold pot 21 through the center portion thereof to allow for a recirculation and complete removal of all flash material that may have accumulated within the transfer pot assembly. At other times during the cycle of operation, a scrubbing effect with a downwardly directed helical, peripheral, vortex flow of gaseous material under pressure will be obtained around the peripheral portions of the piston part, 24, of transfer plunger 22 to thereby carry any flash material downwardly through grid pot 19 and into the base 11 of plastic molding apparatus 10 to effectively remove such material and eliminate the possibility of its being introduced into the mold cavities in the normal operation of the plastic molding apparatus.

It has been determined that the horizontal angular disposition of orifice 26 extending through the side wall of grid pot 19 may vary from between five degrees with respect to a horizontal plane to the maximum physical limit in a downward direction and that the angular relationship therewith between a radial line emanating from a center axis of grid pot 19 may also vary between a limit of five degrees and a substantially tangential relationship with the inside peripheral wall of grid pot 19. One operative embodiment of my invention employed angles of twenty degrees downwardly with respect to a horizontal plane and twenty degrees with respect to a radial line emanating from the center axis of grid pot 19.

The signal responsive control valve shown in block diagrammatic form on FIG. 4 of the drawings may be selected from any suitable type of valve available to those skilled in the art of designing and constructing plastic molding apparatus. In one operative embodiment of my invention, the valve was selected to be operative to allow gaseous material to be supplied to orifice 26 whenever transfer plunger 22 was moving upwardly or downwardly in transfer pots 19 and 21 except during the portion of a cycle when conditioned material was being discharged into transfer pot 19 on top of head 23 of transfer plunger 22. Other combinations of suitable operating cycles consistent with the particular form of plastic molding press may occur to those skilled in the art upon becoming familiar with the concepts of my invention.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In combination with hydraulic molding apparatus of the class wherein a separable mold assembly is cooperatively disposed to receive conditioned plastic molding material from a transfer pot and a transfer plunger is reciprocably disposed in the transfer pot, flash removal apparatus comprising;
  (a) a source of gaseous fluid under pressure;
  (b) means for directing a jet of said fluid within said transfer pot; and
  (c) means operable to selectively connect said last named means to said source of gaseous fluid under pressure.

2. The apparatus of claim 1 in which the means for directing a jet of fluid is an orifice in the wall of the transfer pot and said orifice is directed downwardly and tangentially.

3. The apparatus of claim 2 in which the downward angle of the orifice is greater than five degrees and the tangential angle is greater than five degrees with respect to a radial line from the center line of the transfer pot.

4. The apparatus of claim 1 in which the transfer pot includes a conditioned molding material inlet port and the means for directing a jet of gaseous material is disposed above said port.

5. The apparatus of claim 3 in which the means operable to selectively connect the orifice to the source of fluid is operative in response to the movement of the transfer plunger.

6. The apparatus of claim 5 in which the means operable to selectively connect the orifice to the source of fluid is rendered inoperative by the discharge of conditioned plastic material into the transfer pot.

7. The method of removing undesired flash material from the transfer pot and plunger portions of conditioned plastic material transferring apparatus of the class above described in which the transfer pot includes a conditioned material inlet intermediate its ends and the transfer plunger has an enlarged head portion reciprocably journaled in the transfer pot, which comprises the steps of;
  (a) providing a source of gaseous fluid under pressure; and
  (b) directing a stream of said fluid downwardly and tangentially to a radius of the longitudinal axis of a transfer pot at a location intermediate a material inlet in said transfer pot and one end of said transfer pot.

8. The method of claim 7 in which the stream of fluid is present only when a transfer plunger in the transfer pot is in motion.

9. The method of claim 8 in which the stream of fluid is inhibited during the time that the transfer plunger is disposed intermediate the material inlet in the transfer pot and the other end thereof and conditioned material is present in the transfer pot.

10. The method of claim 7 in which the fluid stream is directed at an angle of greater than five degrees toward the material inlet in the transfer pot and at an angle of greater than five degrees with respect to a radial axis extending between the fluid stream and the longitudinal center axis of the transfer pot.

References Cited
UNITED STATES PATENTS 3,278,992   10/1966   Strauss _____ 264—329

JAMES A. SEIDLECK, *Primary Examiner.*

ALEXANDER H. BRODMERKEL, *Examiner.*

J. R. THURLOW, *Assistant Examiner.*